United States Patent [19]

Müller et al.

[11] Patent Number: 5,284,385
[45] Date of Patent: Feb. 8, 1994

[54] ABS CONTROL WITH REAR PRESSURE RATE REDUCTION WHEN FRONT PRESSURE AND TIME CONDITIONS ARE MET

[75] Inventors: Elmar Müller, Markgroöningen, Fed. Rep. of Germany; Werner Müller, Yokohama, Japan

[73] Assignee: Robert Bosch GmbH, Stuttgart, Fed. Rep. of Germany

[21] Appl. No.: 752,555
[22] PCT Filed: Feb. 9, 1990
[86] PCT No.: PCT/EP90/00204
§ 371 Date: Sep. 4, 1991
§ 102(e) Date: Sep. 4, 1991
[87] PCT Pub. No.: WO90/11916
PCT Pub. Date: Oct. 18, 1990

[30] Foreign Application Priority Data
Mar. 30, 1989 [DE] Fed. Rep. of Germany ....... 3910209

[51] Int. Cl.⁵ .............................................. B60T 8/32
[52] U.S. Cl. .................................. 303/113.5; 303/9.71
[58] Field of Search .................. 303/9.69, 9.71, 93, 303/95, 103, 111, 113 AP-113.5, DIG. 1, DIG. 2, DIG. 4, 100, 110, 9.62; 364/426.02

[56] References Cited

U.S. PATENT DOCUMENTS

| 3,929,380 | 12/1975 | Leiber ...................... 303/DIG. 4 X |
| 4,054,328 | 10/1977 | Leiber et al. .................... 303/106 X |
| 4,093,316 | 6/1978 | Reinecke ........................... 303/100 |
| 4,795,219 | 1/1989 | Brearley et al. ................ 303/100 X |
| 4,883,326 | 11/1989 | Sugitani et al. ................. 303/100 X |
| 4,943,922 | 7/1990 | Tanaka ............................ 303/100 X |
| 4,962,971 | 10/1990 | Miyake ................................ 303/100 |
| 5,028,095 | 7/1991 | Okubo ................................ 303/100 |

Primary Examiner—Robert J. Oberleitner
Assistant Examiner—Josie A. Sallato
Attorney, Agent, or Firm—Felfe & Lynch

[57] ABSTRACT

Antilock control system wherein pressure at the front and rear axles is controlled in cycles which each include a pressure reduction followed by a build-up of the brake pressure in pulses having holding phases therebetween. When a build-up of brake pressure at the front axle exceeds a predetermined time, the rate of build-up at the rear axle is reduced. The system prevents too much pressure build-up at the rear axle during the dynamic load transfer which occurs when braking a vehicle having a high center of gravity relative to its wheel base.

10 Claims, 5 Drawing Sheets

ABS CONTROL WITH REAR PRESSURE RATE REDUCTION WHEN FRONT PRESSURE AND TIME CONDITIONS ARE MET

BACKGROUND OF THE INVENTION

In vehicles with an unfavourable ratio of the height of the centre of gravity to the wheelbase, extreme dynamic axle load transfers lead to a marked relief of the load on the rear axle, particularly in the case of high decelerations. If this state of affairs is not taken into account, a rear-axle pressure build-up decoupled from the vehicle deceleration and from the pressure level of the front axle leads inevitably to vehicle instability.

From DE-OS 2,215,608 (GB-A 1,376,581) it is known that, in vehicles equipped with an ABS and having a high centre of gravity and a short wheel base, overturning can be avoided by not permitting an excessively large difference of the brake pressures at the front and at the rear. If this difference exceeds a predetermined magnitude, the pressure at the front is not increased further.

SUMMARY OF THE INVENTION

The present invention takes account of the dynamic axle load transfer which occurs during ABS operation, in particular by a pressure build-up of reduced rate at the rear axle. The criterion for this is an excessively long continuation of the pressure build-up at the front axle. A high control frequency at the rear axle is thereby avoided and vehicle stability is improved.

DETAILED DESCRIPTION OF THE PREFERRED EMBODIMENT

Figure 1:
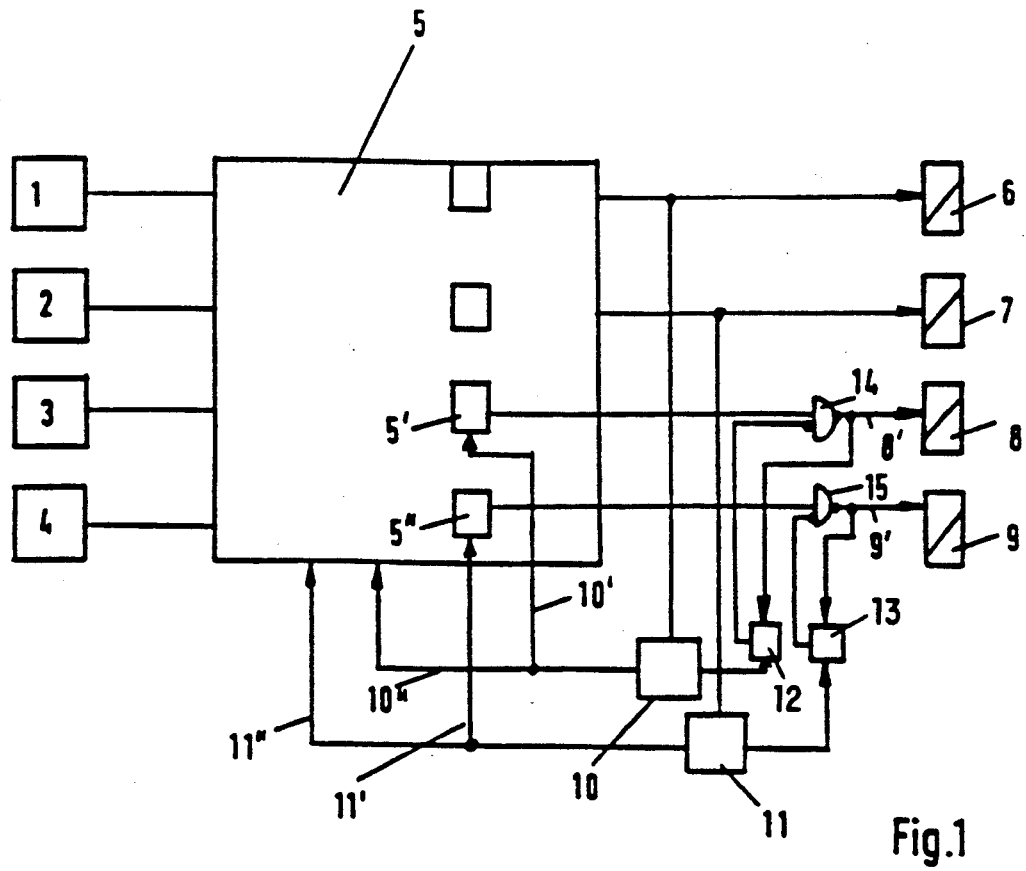
FIG. 1 shows a first illustrative embodiment of an ABS designed in accordance with the invention.

In FIG. 1, sensors allocated to the front wheels of a vehicle are denoted by 1 and 2 and sensors allocated to the rear wheels by 3 and 4. Their signals are fed to an evaluation circuit 5, which from these produces brake pressure control signals for the four wheel brakes. These signals are fed to solenoid valves 6 and 7 allocated to the front wheels and solenoid valves 8 and 9 allocated to the rear wheels. The solenoid valves 6 to 9 are 3/3-way valves which, in their normal position keep the brake line open, in an intermediate position interrupt it and, in a third position, effect a pressure reduction at the brakes.

It is assumed here that the pressure build-up following a pressure reduction is effected in pulsed fashion due to the control, the magnitude of the first pressure pulse depending on the prehistory (size of the preceding pressure reduction and/or length of the preceding pressure build-up phase(s), e.g. number of pulses which have occurred).

Counters 10 and 11 in each case count the pressure build-up pulses occurring after a pressure reduction at respective solenoid valves 6, 7 allocated to the front wheels. If this number of pulses counted exceeds a predetermined magnitude, the associated counter 10 or 11 emits a signal which can trigger one or more of the following effects:

a) The signal can be used to alter the pulse duty factor of a pulse generator 5' or 5" present in the evaluation circuit 5 and allocated to a rear wheel brake (lines 10' or 11'), e.g. to increase the holding phases of the pulses. It is in each case the pulse duty of the pulse generator 5' or 5" which belongs to that side of the vehicle at which pressure is built up for too long which is altered.

b) The signal can be fed to the evaluation circuit 5 in order to reduce there the first pressure pulse for the rear wheel brake to a predetermined extent e.g. to halve it (lines 10" and 11"), in the case of an excessively long pressure build-up at the front, and specifically for the associated vehicle side.

c) The signal fed in accordance with b) can in addition also lower the response thresholds for the pressure reduction (e.g. wheel deceleration threshold and/or slip threshold) for both rear wheels.

d) However, the signal can also be fed to a counter 12 or 13 respectively. This is activated thereby and subsequently counts the brake pressure build-up pulses occurring on the control line 8' or 9' respectively. After a predetermined number, the counter 10 or 11, respectively, emits a signal which inhibits an AND gate 14 or 15, respectively and thus holds the solenoid valve 8 or 9, respectively, in the pressure-holding position.

Figure 2:
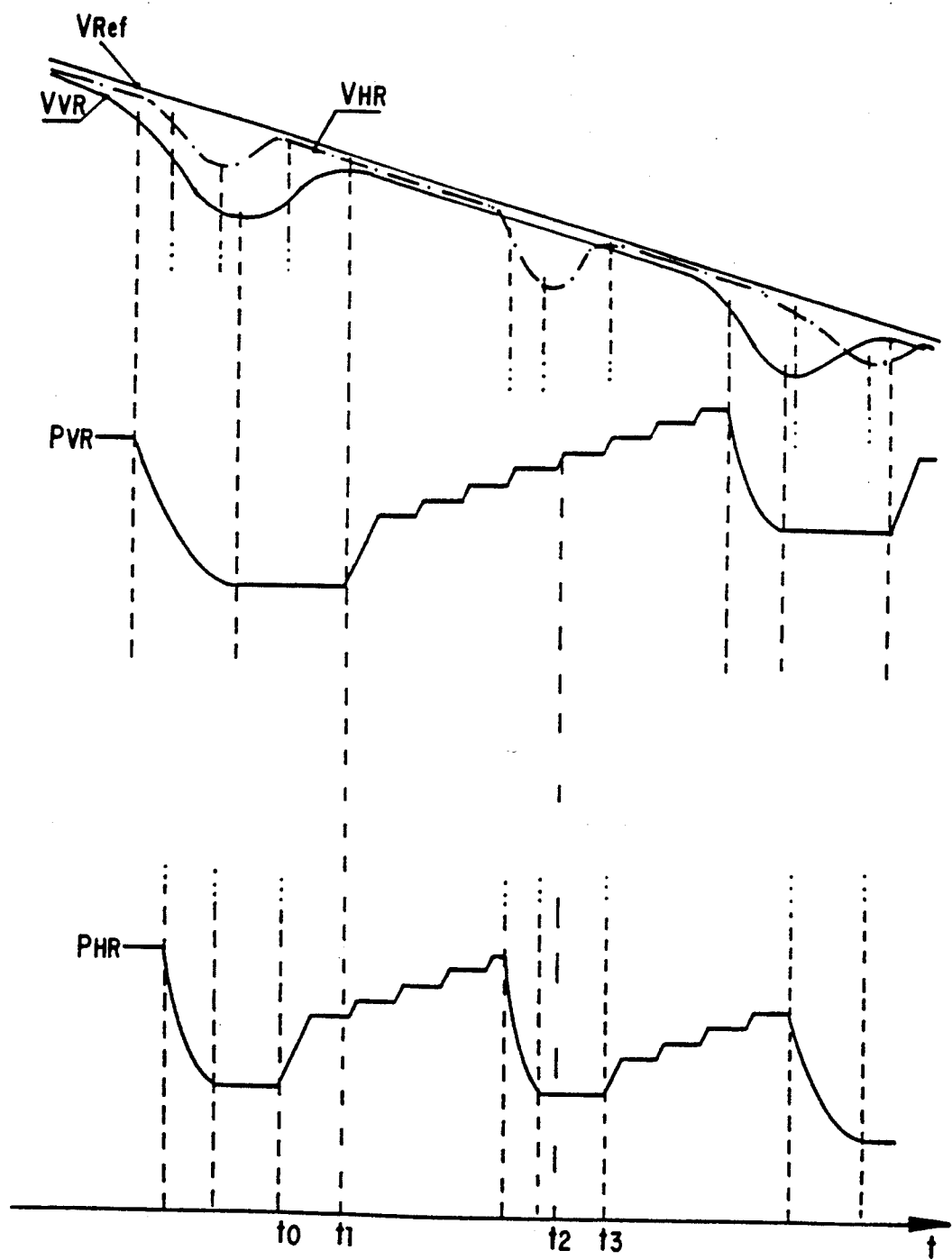
FIGS. 2–5 show diagrams for the purpose of explaining various possibilities of intervention into the control of the rear axle.

In FIGS. 2 to 6, the conditions of cases a) to d) are illustrated for in each case one vehicle side. The following are plotted in each case:

$V_{REF}$ the vehicle reference speed
$V_{VR}$ the speed of the front wheel on the right-hand side
$V_{HR}$ the speed of the rear wheel on the right-hand side
$P_{VR}$ the brake pressure on the front right-hand side
$P_{HR}$ the brake pressure on the rear right-hand side In FIG. 2 (corresponding to b)), a long brake pressure rise of a front wheel (e.g. beyond $t_2$) starts at $t_1$. Exceeding a first predetermined time $t_2-t_1$ leads here to the first pressure pulse of the following control cycle for the rear wheel (beginning at $t_3$) being very much smaller than the corresponding pressure pulse beginning at $t_0$.

Figure 3:
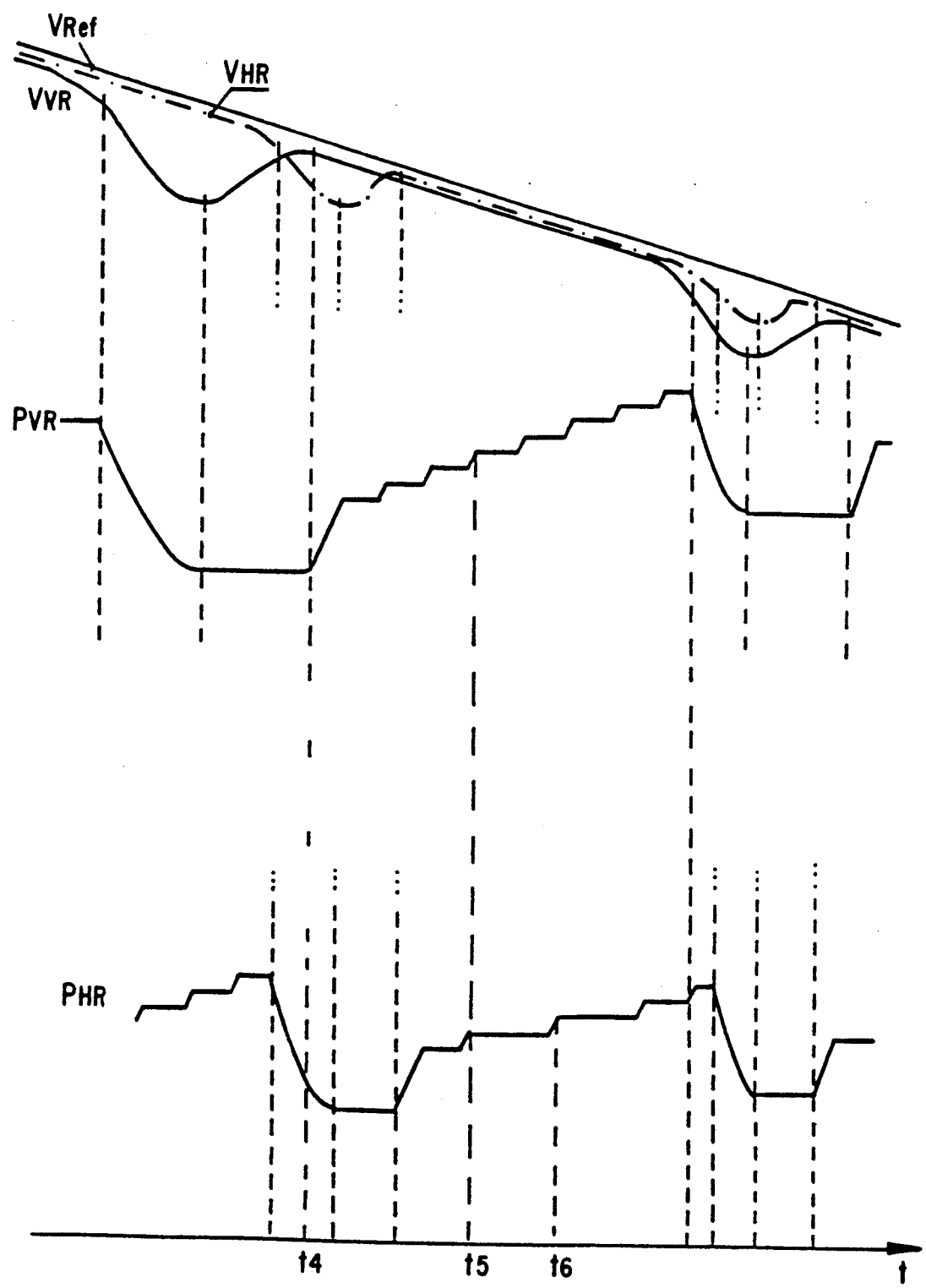

In FIG. 3 (corresponding to a)), the holding phases of the rear wheel beginning at $t_5$ and $t_6$ are prolonged because the pressure rise of the front wheel beginning at $t_4$ continues beyond $t_5$ thereby exceeding a first predetermined time $t_5-t_4$.

Figure 4:
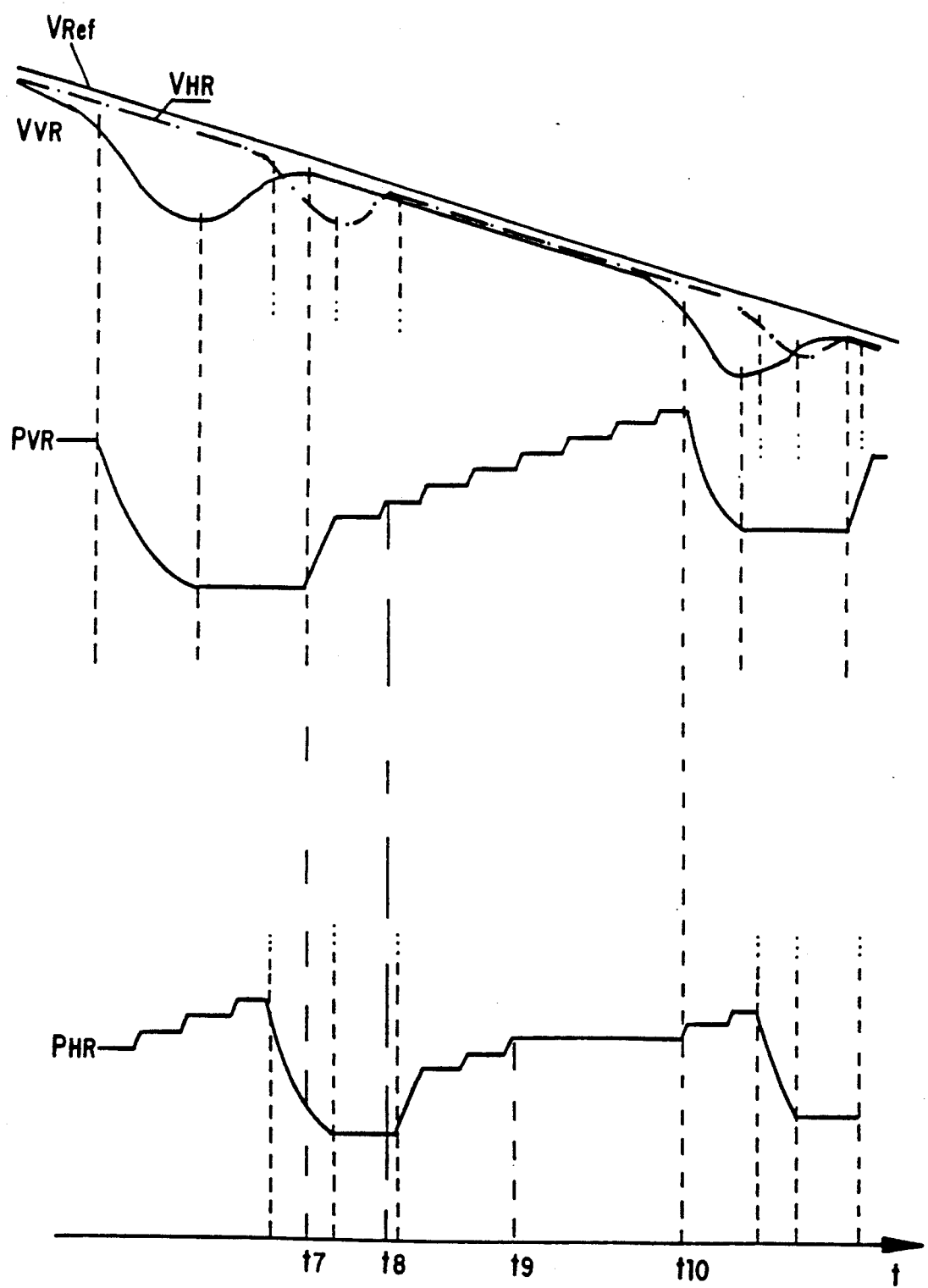

In FIG. 4 (corresponding to d)), it is likewise detected at $t_8$ that the pressure build-up at the front right-hand side is too long, exceeding a first predetermined time $t_8-t_7$. After a second predetermined period of time corresponding to three pressure build-up pulses at the rear wheel, then, the further pressure rise is therefore inhibited at $t_9$ (AND gate 14 or 15 respectively). Since pressure reduction starts again at the front wheel at $t_{10}$, the pressure build-up is here enabled again.

Figure 5:
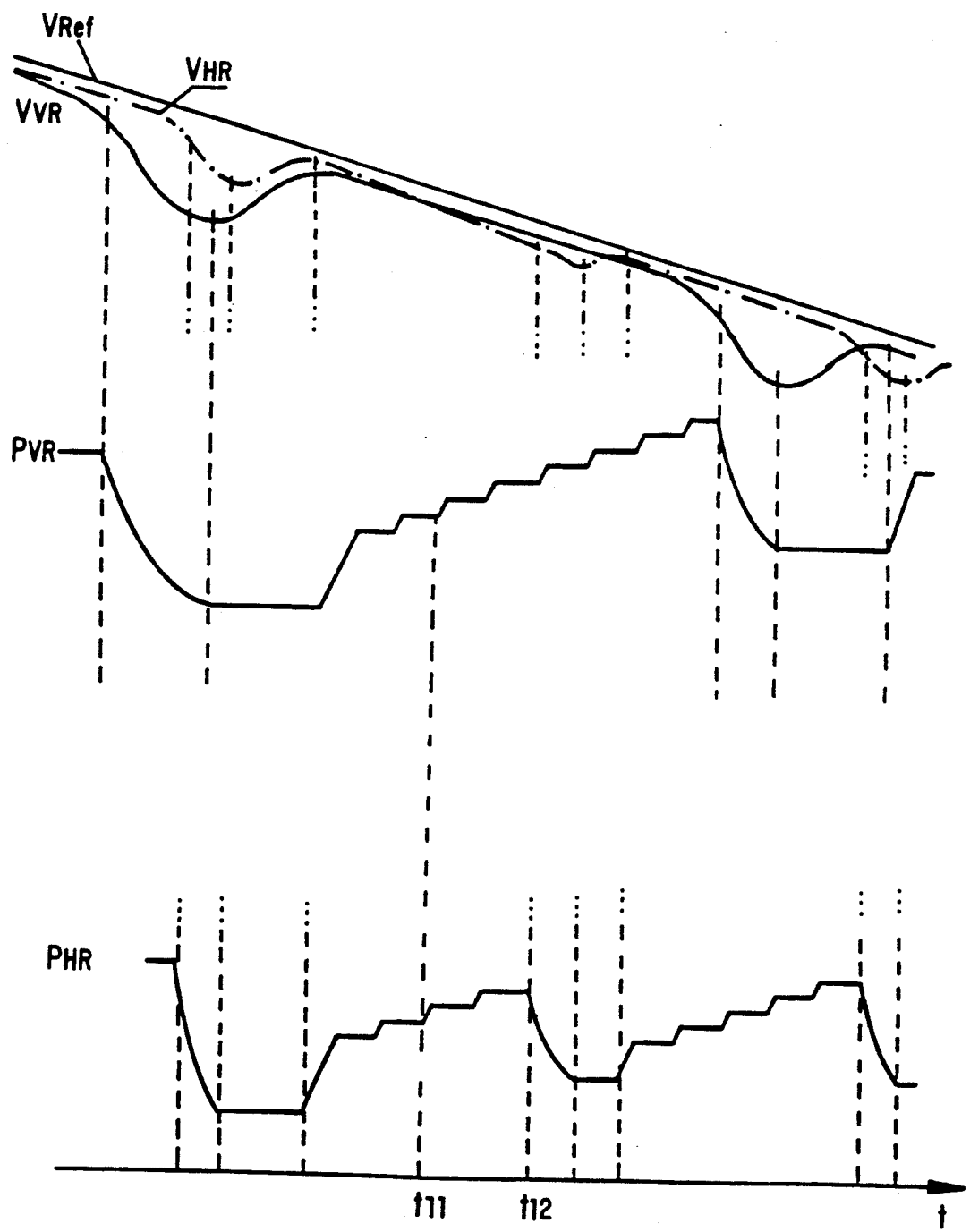

In FIG. 5 (corresponding to c)), the slip threshold is reduced because the pressure build-up at the front likewise continues for too long (beyond a first predetermined time ending at $t_{11}$), with the result that, even with the small deviation of the control rate $V_{HR}$ from the reference $V_{Ref}$, pressure reduction at the rear is triggered at $t_{12}$.

Figure 6:
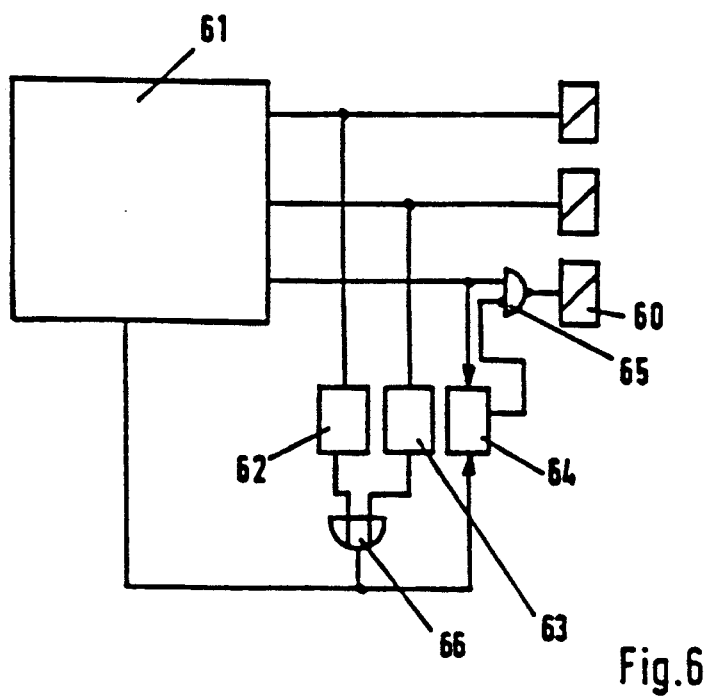
FIG. 6 shows another illustrative embodiment.

FIG. 6 differs from FIG. 1 by the fact that only one solenoid valve 60 is provided for the rear wheel brakes. The pressure build-up pulses are here counted in counters 62 and 63 respectively. When a threshold is reached, these emit a signal which, via an OR gate 66, activates a counter 64, which then counts the pulses on the line to the valve 60. From the time when a threshold is reached, an AND gate 65 is inhibited, with the result that the valve 60 is closed and the pressure is held constant. The signal of the OR gate 66 can also be fed to the evaluation circuit 61, in order to perform switchover operations there.

The invention can also be implemented by means of a computer given appropriate design of the software.

We claim:

1. An anti-lock braking system for a vehicle having a front axle with two wheels and a rear axle with two wheels, said system comprising
   means for controlling brake pressure at the front axle in control cycles each comprising a pressure reduction followed by a build-up of the brake pressure in pulses having holding phases therebetween,
   means for controlling brake pressure at the rear axle in control cycles each comprising a pressure reduction followed by a build-up of the brake pressure in pulses having holding phases therebetween,
   means for determining if the build-up of brake pressure at the front axle exceeds a first predetermined time and
   means for reducing the rate of build-up of brake pressure at the rear axle when said build-up at said front axle and said first predetermined time has been exceeded.

2. An anti-lock braking system as in claim 1 wherein said build-up in pulses at the front and rear axles begins with a first pressure pulse which is longer relative to the pulses which follow, said means for reducing the rate of brake pressure build-up at the rear axle reducing the duration of said first pulse at the rear axle when said predetermined time is exceeded.

3. An anti-locking system as in claim 1 wherein said build-up in pulses at the front and rear axles begins with a first pressure pulse which is longer relative to the pulses which follow, said means for reducing the rate of brake pressure build-up at the rear axle increasing the duration of at least some of the holding phases at said rear axle when said predetermined time is exceeded.

4. An anti-locking system as in claim 1 wherein said build-up in pulses at the front and rear axles begins with a first pressure pulse which is longer relative to the pulses which follow, said means for reducing the rate of brake pressure build-up at the rear axle reducing the duration of at least some of the pulses which follow said first pulse at said rear axle when said predetermined time is exceeded.

5. An anti-locking system as in claim 1 wherein a second means for reducing the rate of brake pressure build-up at the rear axle discontinues brake pressure build-up when said predetermined time is exceeded.

6. An anti-locking system as in claim 5 wherein said second predetermined time is determined by a predetermined number of build-up pulses at the rear axle.

7. An anti-locking system as in claim 1 wherein said means for reducing the rate of pressure build-up at the rear axle in addition reduces at least one threshold at which said pressure at said rear axle is reduced when said pressure build-up at the front axle exceeds said first predetermined time.

8. An anti-locking system as in claim 1 for a vehicle having individual brake pressure control at the front wheels and common brake pressure control at the rear wheels, said means for reducing the rate of brake pressure build-up at said rear axle reducing the rate of pressure build-up at both rear wheels when pressure build-up at either front wheel exceeds said predetermined time.

9. An anti-locking system as in claim 1 for a vehicle having two front wheels with individual brake pressure control and two rear wheels with individual brake pressure control, said means for reducing the rate of brake pressure build-up at said rear axle acting on the rear wheel on the same side of the vehicle as the front wheel where the brake pressure has exceeded the predetermined time.

10. An antilocking system as in claim 1 further comprising means for determining slippage of individual wheels and means for determining when said slippage at each wheel exceeds a respective slippage threshold, said means for reducing the rate of build-up at the rear axle reducing the slippage threshold at said rear axle when said build-up at said front axle exceeds said first predetermined time.

* * * * *